United States Patent
Lee et al.

(10) Patent No.: US 10,552,113 B2
(45) Date of Patent: Feb. 4, 2020

(54) ELECTRONIC DEVICE AND METHOD FOR CONTROLLING OPERATION THEREOF

(71) Applicant: Samsung Electronics Co., Ltd., Gyeonggi-do (KR)

(72) Inventors: Namil Lee, Gyeonggi-do (KR); Hyunchul Yang, Gyeonggi-do (KR); Jaeseong Lee, Gyeonggi-do (KR); Kyuhan Kim, Gyeonggi-do (KR); Kyoungho Bang, Gyeonggi-do (KR); Juhwan Woo, Gyeonggi-do (KR); Juhee Jang, Gyeonggi-do (KR); Hochul Hwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 14 days.

(21) Appl. No.: 15/867,287

(22) Filed: Jan. 10, 2018

(65) Prior Publication Data

US 2018/0196632 A1     Jul. 12, 2018

(30) Foreign Application Priority Data

Jan. 10, 2017 (KR) .................. 10-2017-0003423

(51) Int. Cl.
*H04R 3/04* (2006.01)
*G06F 3/16* (2006.01)
(Continued)

(52) U.S. Cl.
CPC ............ *G06F 3/162* (2013.01); *G08C 23/02* (2013.01); *H04R 3/04* (2013.01); *H04R 29/001* (2013.01)

(58) Field of Classification Search
CPC ........... G06F 3/162; G08C 23/02; H04R 3/04; H04R 25/55; H04R 25/70; H04R 29/001; H04R 2225/43
(Continued)

(56) References Cited

U.S. PATENT DOCUMENTS

| 5,197,332 A | 3/1993 | Shennib |
| 2007/0204694 A1 | 9/2007 | Davis |

(Continued)

FOREIGN PATENT DOCUMENTS

| KR | 2014-0126932 | 11/2014 |
| KR | 2015-0049915 | 5/2015 |

OTHER PUBLICATIONS

European Search Report dated May 24, 2018 issued in counterpart application No. 18150730.2-1207, 10 pages.

*Primary Examiner* — Vivian C Chin
*Assistant Examiner* — Con P Tran
(74) *Attorney, Agent, or Firm* — The Farrell Law Firm, P.C.

(57) ABSTRACT

An electronic device is provided. The electronic device includes a communication circuit, a speaker, a microphone, a memory, and a processor. The processor is configured to determine whether there is auditory data stored in the memory of the electronic device when an external electronic device is connected thereto through the communication circuit, send a request for auditory data to the external electronic device when there is no auditory data stored in the memory, receive the auditory data from the external electronic device, correct data, at the electronic device, about the sound received through the microphone using the auditory data, receive corrected audio data from the external electronic device, synthesize the corrected data about the sound and the corrected audio data received from the external device to obtain first synthesized data, and output a first new sound corresponding to the first synthesized data through the speaker.

20 Claims, 9 Drawing Sheets

(51) Int. Cl.
*G08C 23/02* (2006.01)
*H04R 29/00* (2006.01)

(58) Field of Classification Search
USPC .............. 381/56, 58, 122, 150; 704/258
See application file for complete search history.

(56) References Cited

U.S. PATENT DOCUMENTS

| 2014/0219474 A1* | 8/2014 | Feldt ............... H04R 3/005 381/98 |
| 2015/0023512 A1 | 1/2015 | Shennib |
| 2015/0023534 A1 | 1/2015 | Shennib |
| 2015/0215714 A1 | 7/2015 | Shennib |

* cited by examiner

ELECTRONIC DEVICE AND METHOD FOR CONTROLLING OPERATION THEREOF

PRIORITY

This application claims priority under 35 U.S.C. § 119(a) to Korean Patent Application Serial No. 10-2017-0003423, which was filed in the Korean Intellectual Property Office on Jan. 10, 2017, the entire content of which is incorporated herein by reference.

BACKGROUND

1. Field of the Disclosure

The present disclosure relates generally to an electronic device, and more particularly, to a method for providing, to an electronic device, data corrected based on auditory data, and to a method for controlling the electronic device.

2. Description of the Related Art

A user may often carry and utilize several electronic devices. For example, a user may use a portable terminal (e.g., a mobile phone, a tablet, etc.), a wearable device (e.g., a smart watch, a smart band, etc.), and a hearing device, which are all capable of receiving external sounds and outputting them to the user. For example, a hearing device of a mobile phone can be used to receive sound data from a linked portable terminal and output the received sound data to a user of the mobile phone.

SUMMARY

The present disclosure has been made to address at least the disadvantages described above and to provide at least the advantages described below. Accordingly, an aspect of the present disclosure provides an electronic device that is configured for correcting data based on auditory data, and providing the corrected data to one or more linked electronic devices, and a method for controlling an operation of the electronic device.

In accordance with an aspect of the present disclosure, there is provided an electronic device. The electronic device includes a communication circuit, a speaker, a microphone configured to receive a sound, a memory, and a processor electrically connected with the communication circuit, the speaker, the microphone, and the memory and configured to determine whether there is auditory data stored in the memory of the electronic device when an external electronic device is connected thereto through the communication circuit, send a request for auditory data to the external electronic device when there is no auditory data stored in the memory, receive the auditory data from the external electronic device, correct data, at the electronic device, about the sound received through the microphone using the auditory data, receive corrected audio data from the external electronic device, synthesize the corrected data about the sound and the corrected audio data received from the external device to obtain first synthesized data, and output a first new sound corresponding to the first synthesized data through the speaker.

In accordance with an aspect of the present disclosure, there is provided an electronic device. The electronic device includes a communication circuit, a speaker, a microphone, a memory, and a processor electrically connected with the communication circuit, the speaker, the microphone, and the memory and configured to determine whether there is auditory data stored in the memory of the electronic device when an external electronic device is connected thereto through the communication circuit, send a request for the auditory data to the external electronic device when there is no auditory data stored in the memory, receive the auditory data from the external electronic device, correct audio data reproduced in the electronic device using the auditory data, and transmit the corrected audio data to the external electronic device.

In accordance with an aspect of the present disclosure, there is provided a method for controlling an electronic device including a microphone and a speaker. The method includes determining whether there is auditory data in the electronic device when the electronic device is connected with an external electronic device, sending a request for the auditory data to the external electronic device when there is no auditory data in the electronic device, receiving the auditory data from the external electronic device, correcting data about a sound received through the microphone of the electronic device using the auditory data, receiving corrected audio data from the external electronic device, synthesizing the corrected data about the sound and the corrected audio data to obtain first synthesized data, and outputting a first new sound corresponding to the first synthesized data through the speaker.

In accordance with an aspect of the present disclosure, there is provided a method for controlling an electronic device. The method includes determining whether there is auditory data in the electronic device when the electronic device is connected with an external electronic device, sending a request for the auditory data to the external electronic device when there is no auditory data in the electronic device, receiving the auditory data from the external electronic device, correcting audio data reproduced in the electronic device using the auditory data, and transmitting the corrected audio data to the external electronic device.

BRIEF DESCRIPTION OF THE DRAWINGS

The above and other aspects, features and advantages of certain embodiments of the present disclosure will be more apparent from the following detailed description taken in conjunction with the accompanying drawings, in which.

DETAILED DESCRIPTION

Figure 1:
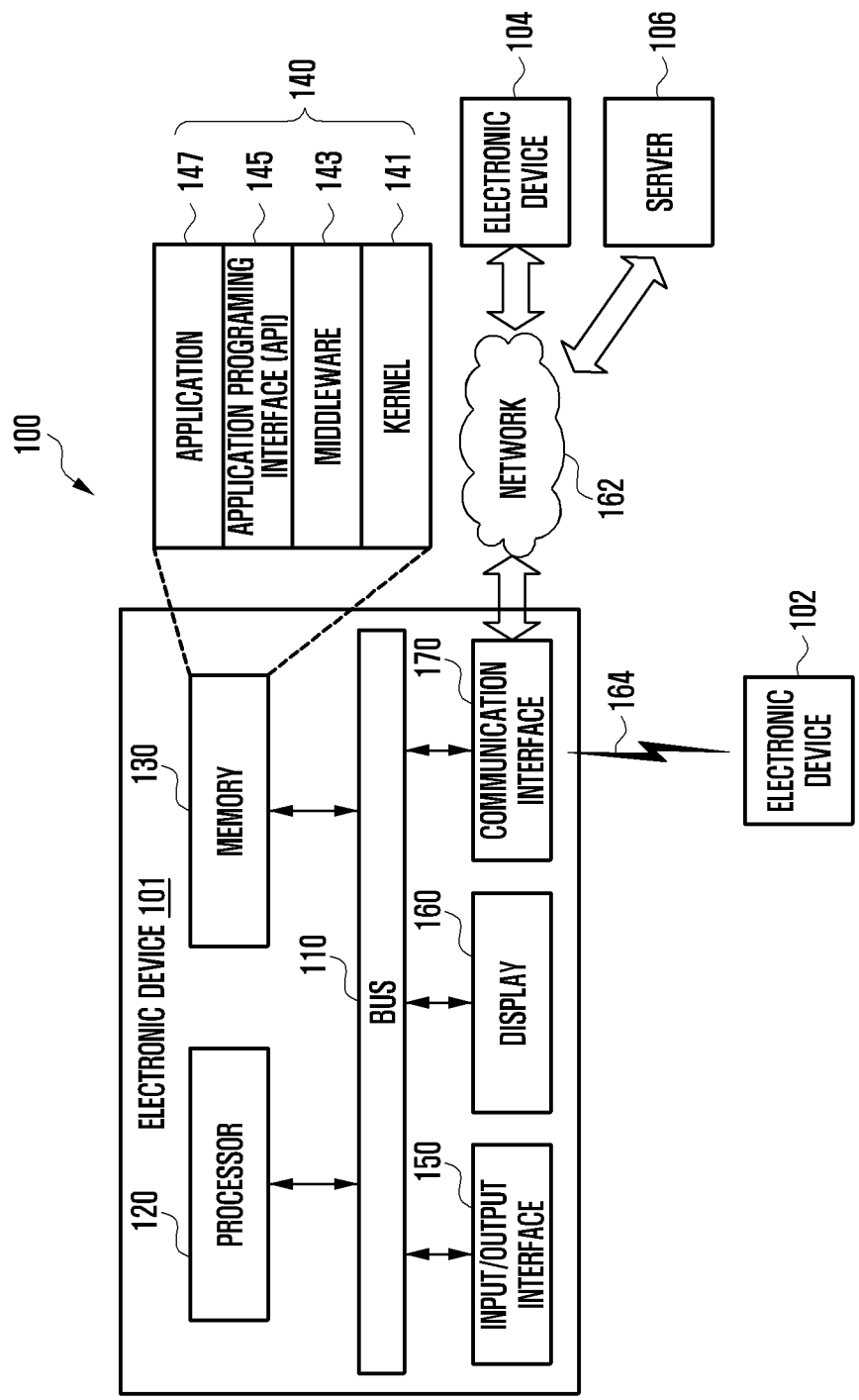
FIG. 1 is a diagram of a network environment including an electronic device, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

An electronic device according to the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of Things device (IoT) (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the present disclosure, the term "user" may indicate a person using an electronic device or a device (e.g., an artificial intelligence electronic device) using an electronic device.

FIG. 1 is a diagram of a network environment 100 including an electronic device 101, according to an embodiment of the present disclosure.

Referring to FIG. 1, the electronic device 101 may include a bus 110, a processor 120, a memory 130, a user input module 150, a display 160, and a communication interface 170.

The bus 110 may be a circuit for interconnecting and for allowing a communication, e.g. by transferring a control message, between the elements described above.

The processor 120 can receive commands from the memory 130, the user input module 150, the display 160, and the communication interface 170 through the bus 110, can decipher the received commands, and perform operations and/or data processing according to the deciphered commands.

The memory 130 can store commands received from the processor 120 and/or the other elements, e.g. the user input module 150, the display 160, and the communication interface 170, and/or commands and/or data generated by the processor 120 (and/or the other elements). The memory 130 may include software and/or programs 140, such as a kernel 141, middleware 143, an application programming interface (API) 145, and an application 147. Each of the programming modules described above may be configured by software, firmware, hardware, and/or combinations of two or more thereof.

The kernel 141 can control and/or manage system resources, e.g. the bus 110, the processor 120 or the memory 130, used for execution of operations and/or functions implemented in other programming modules, such as the middleware 143, the API 145, and/or the application 147. Further, the kernel 141 can provide an interface through which the middleware 143, the API 145, and/or the application 147 can access and then control and/or manage an individual element of the electronic apparatus 101.

The middleware 143 can perform a relay function which allows the API 145 and/or the application 147 to communicate with and exchange data with the kernel 141. Further, in relation to operation requests received from the application 147, the middleware 143 can perform load balancing in relation to the operation requests by giving a priority in using a system resource, e.g. the bus 110, the processor 120, and/or the memory 130, of the electronic device 101 to at least one application from among the applications 147.

The API 145 is an interface through which the application 147 can control a function provided by the kernel 141 and/or the middleware 143, and may include at least one interface or function for file control, window control, image processing, and/or character control.

The user input module 150 can receive a command and/or data from a user, and transfer the received command and/or data to the processor 120 and/or the memory 130 through the bus 110. The display 160 can display an image, video, and/or data to a user.

The communication interface 170 can establish a communication between the electronic device 101 and electronic devices 102 and 104 and/or a server 106. For example, the communication interface 170 may be connected to a network 162 through wireless or wired communication to communicate with the electronic device 104 or the server 106.

The wireless communication may use at least one of long term evolution (LTE), LTE-advance (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include short range communication 164. The short-range communication 164 may be performed by using at least one of wireless-fidelity (Wi-Fi), bluetooth, near field communication (NFC), and global navigation satellite system (GNSS). The GNSS may include at least one of a global positioning system (GPS), a global navigation satellite system (Glonass), a navigation satellite system (Beidou), and a European global satellite-based navigation system (Galileo), according to a use area, a bandwidth, or the like. The term "GPS" may be interchangeably used with the term "GNSS". The wired communication may include at least one of a universal serial bus (USB), a high definition multimedia Interface (HDMI), recommended standard 232 (RS-232), and a plain old telephone service (POTS). The network 162 may include at least one of a communication network such as a computer network (e.g., a local area network (LAN) or a wireless area network (WAN)), the Internet, and a telephone network.

Each of the electronic devices 102 and 104 may be of a type identical to or different from that of the electronic device 101. The server 106 may include a group of one or more servers. All or some of the operations performed in the electronic device 101 may be performed in the electronic devices 102 and 104 or the server 106. When the electronic device 101 has to perform some functions or services automatically or in response to a request, the electronic device 101 may make a request for performing at least some functions relating to the electronic devices 102 or 104 or the server 106 instead of performing the functions or services by itself or in addition. The electronic devices 102 or 104 or the server 106 may execute the requested functions or the additional functions, and may deliver a result of the execution to the electronic device 101. The electronic device 101 may provide the received result as it is or additionally process the received result and provide the requested functions or services. To achieve this, cloud computing, distributed computing, or client-server computing technology may be used.

Figure 2:
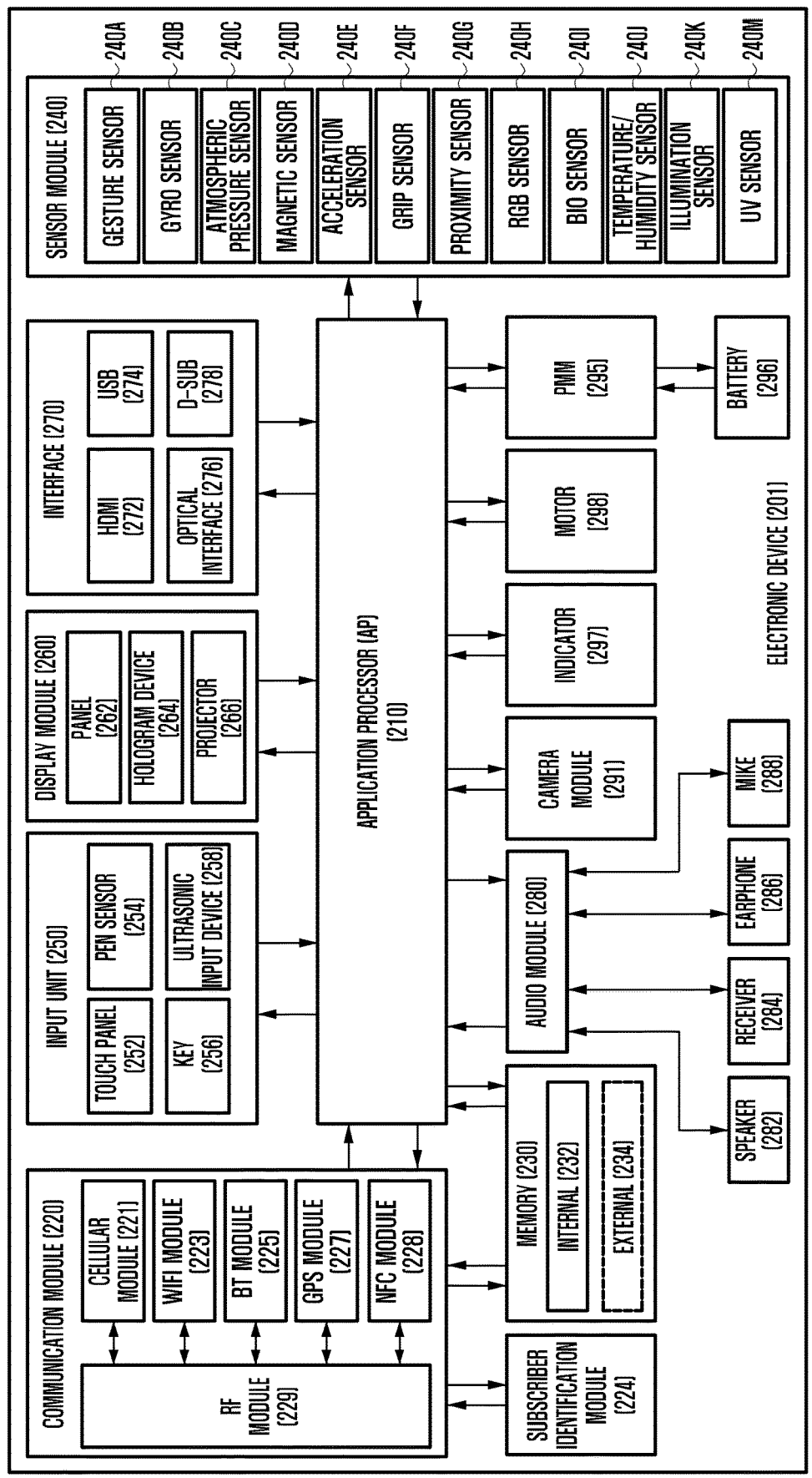
FIG. 2 is a block diagram of an electronic device, according to an embodiment of the present disclosure.

FIG. 2 is a block diagram of an electronic device 201, in accordance with an embodiment of the present disclosure. The electronic device 201 may form the whole or part of the electronic device 201 shown in FIG. 1. The electronic device 201 may include at least one application processor (AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The AP 210 may drive an operating system (OS) or applications, control a plurality of hardware or software components connected thereto, and also perform processing and operation for various data including multimedia data. The AP 210 may be formed of a system-on-chip (SoC). The AP 210 may further include a graphic processing unit (GPU).

The communication module 220 may perform a data communication with any other electronic device (e.g., the electronic device 104 or the server 106) connected to the electronic device 200 through the network 162. The communication module 220 may include therein a cellular module 221, a WiFi module 223, a BT module 225, a GPS module 227, an NFC module 228, and a radio frequency (RF) module 229.

The cellular module 221 may offer a voice call, a video call, a message service, an internet service, or the like through a communication network (e.g., LTE, LTE-A, CDMA, WCDMA, UMTS, WiBro, or GSM, etc.).

Additionally, the cellular module 221 may perform identification and authentication of the electronic device in the communication network, using the SIM 224. The cellular module 221 may perform at least part of functions that the AP 210 can provide. For example, the cellular module 221 may perform at least part of a multimedia control function.

The cellular module 221 may include a communication processor (CP), and the cellular module 221 may be formed of an SoC. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements.

The AP 210 or the cellular module 221 (e.g., the CP) may load commands or data, received from a non-volatile memory connected thereto or from at least one of the other elements, into a volatile memory to process them. Additionally, the AP 210 or the cellular module 221 may store data, received from or created by one or more of the other elements, in the nonvolatile memory.

Each of the WiFi module 223, the BT module 225, the GPS module 227 and the NFC module 228 may include a processor for processing data transmitted or received thereto. Although FIG. 2 shows the cellular module 221, the WiFi module 223, the BT module 225, the GPS module 227 and the NFC module 228 as different blocks (or modules), at least part of them may be contained in a single integrated circuit (IC) chip or a single IC package. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

The RF module 229 may transmit and receive data, e.g., RF signals or any other electric signals. The RF module 229 may include a transceiver, a power amp module (PAM), a frequency filter, a low noise amplifier (LNA), or the like. Also, the RF module 229 may include any component, e.g., a wire or a conductor, for transmission of electromagnetic waves in a free air space. Although FIG. 2 shows that the cellular module 221, the WiFi module 223, the BT module 225, the GPS module 227 and the NFC module 228 share the RF module 229, at least one of them may perform transmission and reception of RF signals through a separate RF module.

The SIM 224 may include a card, and may be an embedded SIM, and may contain unique identification information (e.g., an integrated circuit card identifier (ICCID)) or subscriber information (e.g., an international mobile subscriber identity (IMSI)).

The memory 230 may include an internal memory 232 or an external memory 234. The internal memory 232 may include at least one of a volatile memory (e.g., a dynamic random access memory (DRAM), a static RAM (SRAM), a synchronous Dynamic RAM (SDRAM), and the like) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard driver, or a solid state drive (SSD).

The external memory 234 may further include a flash drive a compact flash (CF), a secure digital (SD), a micro secure digital (Micro-SD), a mini secure digital (Mini-SD), an eXtreme digital (xD), a multi-media card (MMC), a memory stick. The external memory 234 may be functionally and/or physically connected to the electronic device 201 through various interfaces.

The sensor module 240 may measure physical quantity or sense an operating status of the electronic device 201, and then convert measured or sensed information into electric signals. The sensor module 240 may include at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., red, green, blue (RGB) sensor), a biometric sensor 240I, a temperature-humidity sensor 240J, an illumination sensor 240K, and an ultraviolet (UV) sensor 240M. Additionally or alternatively, the sensor module 240 may include, e.g., an e-nose sensor, an electromyography (EMG) sensor, an electroencephalogram (EEG) sensor, an electrocardiogram (ECG) sensor, an infrared (IR) sensor, an iris scan sensor, or a finger scan sensor. Also, the sensor module 240 may include a control circuit for controlling one or more sensors equipped therein.

The input device 250 may include a touch panel 252, a (digital) pen sensor 254, a key 256, or an ultrasonic input unit 258. The touch panel 252 may use at least one of, for example, a capacitive scheme, a resistive scheme, an infrared scheme, and an ultrasonic scheme. Further, the touch panel 252 may further include a control circuit. The touch panel 252 may further include a tactile layer and provide a tactile reaction to the user.

The (digital) pen sensor 254 may include a recognition sheet which is a part of the touch panel 252 or is separated from the touch panel 252. The key 256 may include a physical button, an optical key or a keypad. The ultrasonic input device 258 may detect ultrasonic waves generated by an input tool through a microphone 288 and identify data corresponding to the detected ultrasonic waves. The electronic device 201 may receive a user input from any external device (e.g., a computer or a server) connected thereto through the communication module 220.

The display 260 may include a panel 262, a hologram 264, or a projector 266. The panel 262 may be a liquid crystal display (LCD), an active matrix organic light emitting diode (AM-OLED), or the like. The panel 262 may be implemented to be, for example, flexible, transparent, or wearable. The panel 262 and the touch panel 252 may be implemented as one module. The hologram device 264 may show a three dimensional (3D) image in the air by using interference of light. The projector 266 may display an image by projecting light onto a screen. The screen may be located in the interior of or on the exterior of the electronic device 201. The display 260 may further include a control circuit for controlling the panel 262, the hologram device 264, or the projector 266.

The interface 270 may include an HDMI 272, a USB 274, an optical interface 276, or a d-subminiature (D-sub) 278. The interface 270 may be included in the communication interface 170 illustrated in FIG. 1. Additionally or alternatively, the interface 270 may include a mobile high-definition Link (MHL) interface, an (SD card/multi-media card (MMC) interface, or an Infrared Data Association (IrDA) standard interface.

The audio module 280 may perform a conversion between sounds and electric signals. The audio module 280 may process sound information inputted or outputted through a speaker 282, a receiver 284, an earphone 286, or the microphone 288.

The camera module 291 is a device capable of obtaining still images and moving images. The camera module 291 may include at least one image sensor (e.g., a front sensor or a rear sensor), a lens, an image signal processor (ISP), or a flash (e.g., LED or xenon lamp).

The power management module 295 may manage electric power of the electronic device 201, and may include a Power Management Integrated Circuit (PMIC), a charger IC, or a battery gauge.

The PMIC may be formed of an IC chip or an SoC. Charging may be performed in a wired or wireless manner. The charger IC may charge the battery 296 and prevent overvoltage or overcurrent from a charger. The charger IC may have a charger IC used for at least one of wired and wireless charging types. A wireless charging type may include a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 201. The battery 296 may be a rechargeable battery or a solar battery.

The indicator 297 may show thereon a current state (e.g., a booting state, a message state, or a recharging state) of the electronic device 201 or the AP 210. The motor 298 may convert an electric signal into a mechanical vibration. Although not shown, the electronic device 201 may include a specific processor (e.g., GPU) for supporting a mobile TV. This processor may process media data that complies with standards of digital multimedia broadcasting (DMB), digital video broadcasting (DVB), or MediaFlo™.

Each of the above-described component elements of hardware may be configured with one or more components, and the names of the corresponding component elements may vary based on the type of electronic device. The electronic device may include at least one of the aforementioned elements. Some elements may be omitted or other additional elements may be further included in the electronic device. Also, some of the hardware components may be combined into one entity, which may perform functions identical to those of the relevant components before the combination.

When the electronic device 201 is connected with an external electronic device (e.g., the electronic devices 102, 104, or the server 106), the AP 210 may determine whether there is auditory data in the electronic device 201 (e.g., in the memory 230). For example, the auditory data may include information about an amount of noise attenuation, a filter value, a pass frequency, a cutoff frequency, a sound amplification value, directionality, user-specific fitting parameters, etc., corresponding to a user's auditory characteristics.

If there is no auditory data, the AP 210 may receive auditory data from the connected external electronic device through the communication module 220. If there is no auditory data, the AP 210 may generate auditory data by measuring and analyzing the user's auditory characteristics. The AP 210 may check whether the external electronic device has auditory data. If the external electronic device has no auditory data, the AP 210 may transmit auditory data to the external electronic device through the communication module 220.

The AP 210 may transmit and receive various kinds of data (e.g., data about a received sound, audio data being reproduced, etc.) from an external electronic device using the communication module 220.

The AP 210 may receive a sound f through the microphone 288 and store data about the received sound, at least temporarily, in the memory 230. The AP 210 may convert the received sound into digital data.

The AP 210 may correct data associated with a sound (e.g., data about a received sound or audio data being reproduced) using auditory data. For example, using the auditory data, the AP 210 may correct the data about a sound or the audio data to fit user's auditory characteristics. The AP 210 may synthesize data about a sound (or corrected data about a sound) and audio data (or corrected audio data). The AP 210 may mix the data about a sound and the audio data according to a predetermined ratio or parameter value.

The AP 210 may output a sound corresponding to data about a received sound, audio data being reproduced, or synthesized data through the speaker 282. The memory 230 may store auditory data.

An electronic device may include a communication circuit; a speaker; a microphone for receiving a sound from an outside of the electronic device; a processor electrically connected with the communication circuit, the speaker, and the microphone; and a memory electrically connected with the processor. The memory stores instructions that cause, upon execution, the processor to determine whether there is auditory data in the electronic device, when an external electronic device is connected through the communication circuit, to send a request for the auditory data to the external electronic device when there is no auditory data, to receive the auditory data from the external electronic device, to correct data about a sound of the outside of the electronic device received through the microphone by using the auditory data, to receive corrected audio data from the external electronic device, to synthesize the corrected data about the sound and the corrected audio data to obtain first synthesized data, and to output a first new sound corresponding to the first synthesized data through the speaker.

The corrected audio data may include data obtained by correcting audio data reproduced in the external electronic device by using the auditory data.

The instructions may further cause, upon execution, the processor to receive audio data from the external electronic device when there is the auditory data in the electronic device, to synthesize the data about the sound and the received audio data to obtain second synthesized data, to correct the second synthesized data by using the auditory data, and to output a second new sound corresponding to the corrected second synthesized data through the speaker.

The instructions may further cause, upon execution, the processor to check whether there is the auditory data in the external electronic device, when there is the auditory data in the electronic device, and to transmit the auditory data to the external electronic device when there is no auditory data in the external electronic device.

The instructions may further cause, upon execution, the processor to transmit the data about the sound to the external electronic device, to receive corrected data of second synthesized data obtained by synthesizing the data about the sound and audio data from the external electronic device, and to output a second new sound corresponding to the received corrected data through the speaker.

An electronic device may include a communication circuit; a speaker; a microphone; a processor electrically connected with the communication circuit, the speaker, and the microphone; and a memory electrically connected with the processor. The memory stores instructions that cause, upon execution, the processor to determine whether there is auditory data in the electronic device, when an external electronic device is connected through the communication circuit, to send a request for the auditory data to the external electronic device when there is no auditory data, to receive the auditory data from the external electronic device, to correct audio data reproduced in the electronic device by using the auditory data, and to transmit the corrected audio data to the external electronic device.

The instructions may further cause, upon execution, the processor to check whether there is the auditory data in the external electronic device, when there is the auditory data in the electronic device, and to transmit the auditory data to the external electronic device when there is no auditory data in the external electronic device.

The instructions may further cause, upon execution, the processor to generate the auditory data by performing a hearing measurement function when there is no auditory data in both the electronic device and the external electronic device.

The instructions may further cause, upon execution, the processor to transmit the generated auditory data to the external electronic device.

The instructions may further cause, upon execution, the processor to receive, from the external electronic device, data about a sound received by the external electronic device, to synthesize the received data about the sound and the reproduced audio data to obtain synthesized data, to correct the synthesized data, and to transmit the corrected synthesized data to the external electronic device.

Figure 3:
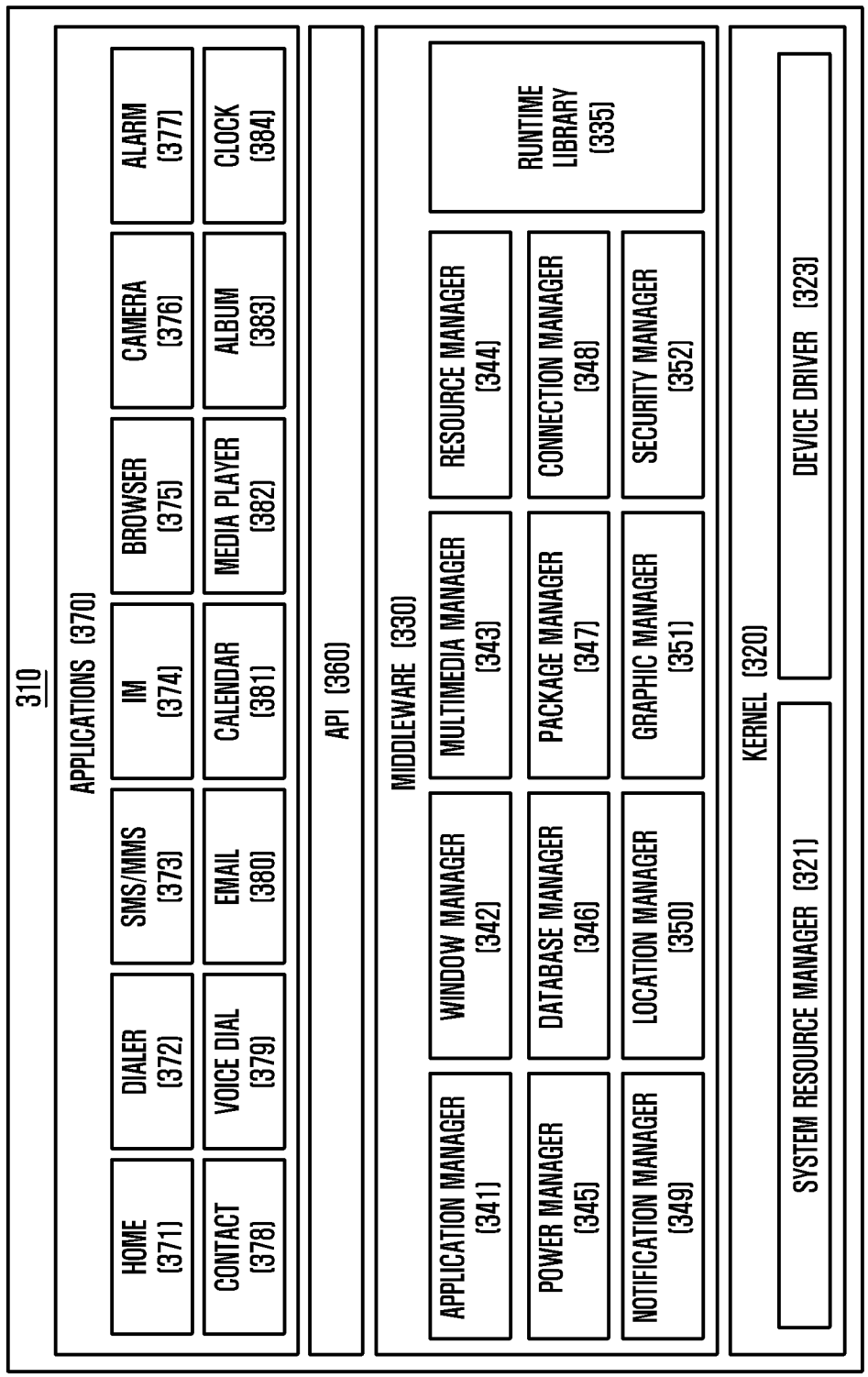
FIG. 3 is a block diagram of a program module, according to an embodiment of the present disclosure.

FIG. 3 is a block diagram of a programming module 310, according to an embodiment of the present disclosure.

The programming module 310 may be included (or stored) in the electronic device 101 (e.g., the memory 130) illustrated in FIG. 1 or may be included (or stored) in the electronic device 201 (e.g., the memory 230) illustrated in FIG. 2. At least a part of the programming module 310 may be implemented in software, firmware, hardware, or a combination of two or more thereof. The programming module 310 may be implemented in hardware, and may include an OS controlling resources related to an electronic device (e.g., the electronic device 101 or 201) and/or various applications (e.g., an application 370) executed in the OS. For example, the OS may be Android™, iOS™, Windows™ Symbian™, Tizen™, Bada™, and the like.

Referring to FIG. 3, the programming module 310 may include a kernel 320, a middleware 330, an API 360, and/or the application(s) 370.

The kernel 320 may include a system resource manager 321 and/or a device driver 323. The system resource manager 321 may include a process manager, a memory manager, and a file system manager. The system resource manager 321 may perform the control, allocation, recovery, and/or the like of system resources.

The device driver 323 may include a display driver), a camera driver, a BT driver, a shared memory driver, a USB driver, a keypad driver, a Wi-Fi driver, and/or an audio driver. Also, the device driver 323 may include an inter-process communication (IPC) driver.

The middleware 330 may include multiple modules previously implemented so as to provide a function used in common by the application 370. Also, the middleware 330 may provide a function to the application 370 through the API 360 in order to enable the application 370 to efficiently use limited system resources within the electronic device. For example, as illustrated in FIG. 3, the middleware 330 may include a runtime library 335, an application manager 341, a window manager 342, a multimedia manager 343, a resource manager 344, a power manager 345, a database manager 346, a package manager 347, a connection or connectivity manager 348, a notification manager 349, a location manager 350, a graphic manager 351, a security manager 352, and any other suitable and/or similar manager.

The runtime library 335 may include a library module used by a complier, in order to add a new function by using a programming language during the execution of the application 370. The runtime library 435 may perform functions which are related to an input and output, the management of a memory, an arithmetic function, and/or the like.

The application manager 341 may manage a life cycle of the application 370. The window manager 342 may manage one or more graphic user interfaces (GUI) resources used on a screen of the electronic device. The multimedia manager 343 may detect a format used to reproduce various media files and may encode or decode a media file through a codec appropriate for the relevant format. The resource manager 344 may manage resources, such as a source code, a memory, a storage space, and/or the like of the application 370.

The power manager 345 may operate together with a basic input/output system (BIOS), may manage a battery or power, and may provide power information and the like used for an operation. The database manager 346 may manage a database in such a manner as to enable the generation, search and/or change of the database to be used by the application 370. The package manager 347 may manage the installation and/or update of an application distributed in the form of a package file.

The connectivity manager 348 may manage a wireless connectivity such as, for example, Wi-Fi and BT. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. When the electronic device has a telephone function, the middleware 330 may further include a telephony manager for managing a voice telephony call function and/or a video telephony call function of the electronic device.

The middleware 330 may generate and use a new middleware module through various functional combinations of the above-described internal element modules. The middleware 330 may provide modules specialized according to a type of OS in order to provide differentiated functions. Also, the middleware 330 may dynamically delete some of the existing elements, or may add new elements. Accordingly, the middleware 330 may omit some of the elements described herein, may further include other elements, or may replace the some of the elements with elements, each of which performs a similar function and has a different name.

The API 360 is a set of API programming functions, and may be provided with a different configuration according to an OS. In the case of Android™ or iOS™, for example, one API set may be provided to each platform. In the case of Tizen™, for example, two or more API sets may be provided to each platform.

The application 370 may include a preloaded application and/or a third party application. The application 370 may include a home application 371, a dialer application 372, an SMS/MMS application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 310 may be implemented by instructions stored in a non-transitory computer-readable storage medium. When the instructions are executed by one or more processors (e.g., the AP 210), the one or more processors may perform functions corresponding to the instructions. The non-transitory computer-readable storage medium may be, for example, the memory 230. At least a part of the programming module 310 may be implemented (e.g., executed) by, for example, the one or more processors. At least a part of the programming module 310 may include, for example, a module, a program, a routine, a set of instructions, and/or a process for performing one or more functions.

According to one embodiment, the application 370 may include a specific application (e.g., a hearing aid application) capable of correcting data about a sound or audio data according to user's auditory characteristics. The application 370 may include a specific application for synthesizing (or mixing) a plurality of sounds or audio related data.

Figure 4:
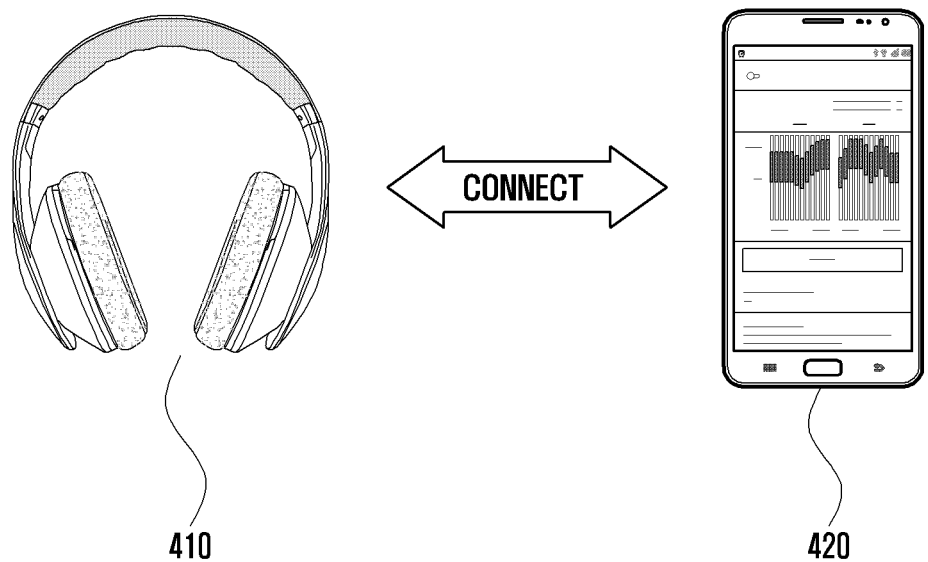
FIG. 4 is a diagram of using electronic devices, according to an embodiment of the present disclosure.

FIG. 4 is a diagram of using electronic devices, according to an embodiment of the present disclosure.

A first electronic device 410 (e.g., a headset) may include a microphone and/or a speaker. The first electronic device 410 may output a sound through the speaker. The first electronic device 410 may be worn on at least a portion of the user's body, and may output a sound in the vicinity of the user's ear through the speaker. The first electronic device 410 may convert a digital signal (e.g., digital data) into an analog signal (e.g., sound) and then output it. The first electronic device 410 may receive a sound through the microphone and then generate or store data about the received sound. The first electronic device 410 may generate the data about the received sound by converting the received sound into electrical data. The first electronic device 410 may convert an analog signal into a digital signal. The first electronic device 410 may store the data about the received sound at least temporarily. The first electronic device 410 may have various forms suitable for a user's purpose of use, and may also provide various functions, and the first electronic device 410 may include a headset, a headphone, an earpiece, a hearing aid, or a personal sound amplification product.

A second electronic device 420 (e.g., a portable terminal, etc.) may provide various functions including, but not limited to, a call function (e.g., a voice call, a video call, or an internet call), a content playback function (e.g., a music playback or a video playback), a data transmission/reception function, and the like.

The first electronic device 410 or the second electronic device 420 may provide an auditory correction function. For example, the first electronic device 410 or the second electronic device 420 may correct data about a sound received from an outside thereof or audio data internally reproduced. The first electronic device 410 or the second electronic device 420 may correct such data to fit user's auditory characteristics by using a user's auditory data. The auditory data may include information about an amount of noise attenuation, a filter value, a pass frequency, a cutoff frequency, a sound amplification value, directionality, user-specific fitting parameters, etc., corresponding to the user's auditory characteristics. The first electronic device 410 and the second electronic device 420 may correct different data. For example, the first electronic device 410 may correct data about a sound received from the outside (e.g., an external sound), whereas the second electronic device 420 may correct audio data being reproduced therein (e.g., an internal sound). The audio data being reproduced in the first electronic device 410 or the second electronic device 420 may include audio data during the playback of content (audio content or video content), or voice data during telephony.

The first electronic device 410 may be connected with the second electronic device 420 through wired or wireless communication.

The first electronic device 410 and the second electronic device 420 may share data through communication. The first electronic device 410 and the second electronic device 420 may share a user's auditory data. For example, the first electronic device 410 or the second electronic device 420 may transmit or receive corrected data about a sound or corrected audio data.

The first electronic device 410 or the second electronic device 420 may synthesize data about a sound and audio data. For example, the first electronic device 410 or the second electronic device 420 may mix data about a sound and audio data according to a predetermined ratio or parameter value.

Figure 5:
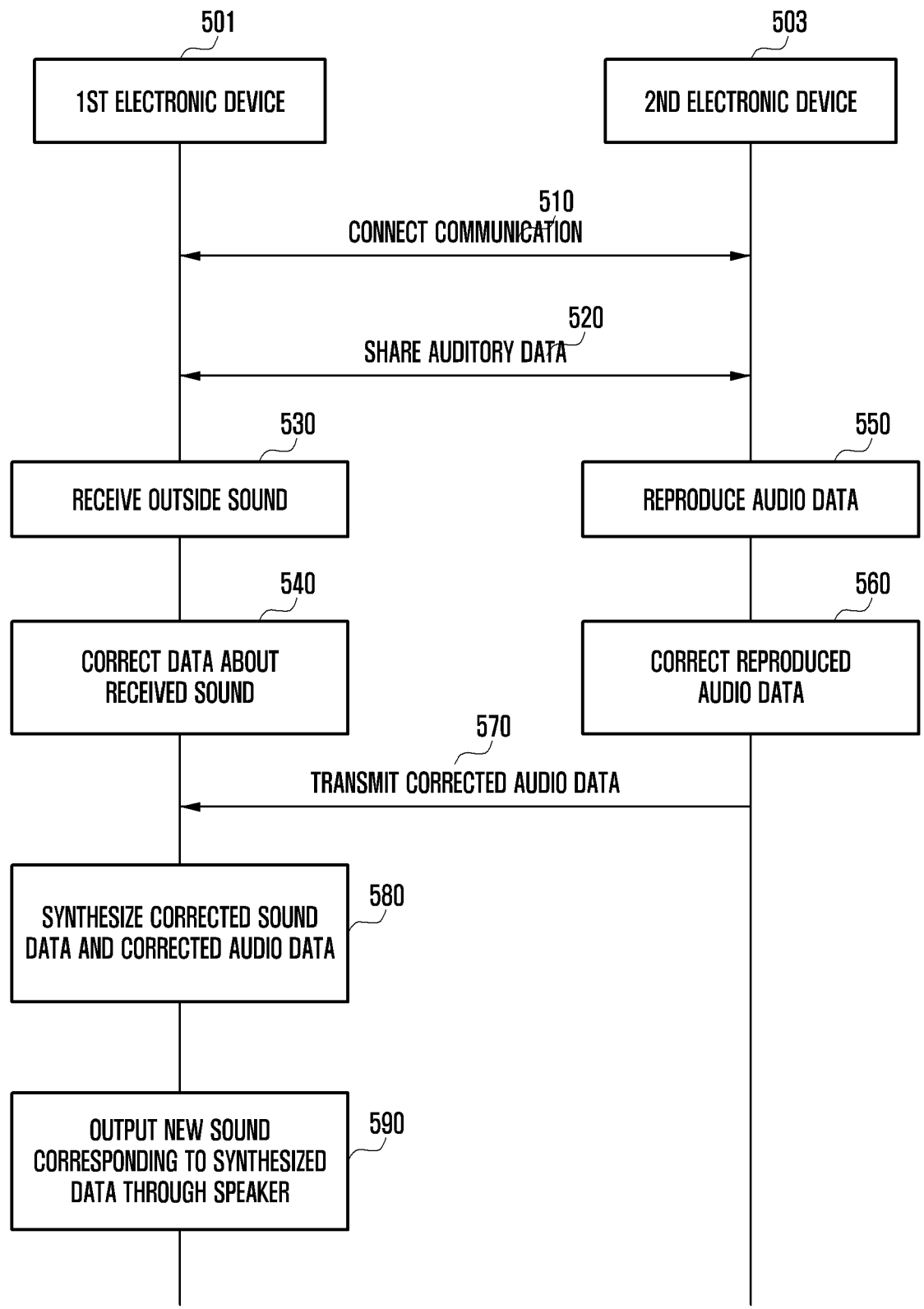
FIG. 5 is a flowchart of a method of use of an electronic devices, according to an embodiment of the present disclosure.

FIG. 5 is a flowchart of a method for electronic devices, according to an embodiment of the present disclosure.

Each of a first electronic device 501 (e.g., a headset, etc.) and a second electronic device 503 (e.g., a portable terminal) may include all or some of elements shown in FIGS. 1 to 3.

At operation 510, the first electronic device 501 and the second electronic device 503 may be connected with each other via one of the aforementioned communication schemes. For example, the first electronic device 501 and the second electronic device 503 may be connected with each other through wired or wireless communication. The first electronic device 501 or the second electronic device 503 may detect each other or a neighboring electronic device. The first electronic device 501 or the second electronic device 503 may establish a communication channel by sending a connection request to the detected neighboring device and receiving a connection response.

At operation 520, the first electronic device 501 and the second electronic device 503 may share auditory data. The auditory data may include information about a user's auditory characteristics or various parameter values determined according to the user's auditory characteristics.

When the second electronic device 503 is connected to the first electronic device 501, the first electronic device 501 may check whether there is auditory data in the first electronic device 501. If there is no auditory data, the first electronic device 501 may send a request for auditory data to the second electronic device 503 and then receive the auditory data from the second electronic device 503. If there is auditory data, the first electronic device 501 may further check whether there is auditory data in the second electronic device 503. If there is no auditory data in the second electronic device 503, the first electronic device 501 may transmit auditory data to the second electronic device 503.

When the first electronic device 501 is connected, the second electronic device 503 may check whether there is auditory data in the second electronic device 503. If there is no auditory data, the second electronic device 503 may send a request for auditory data to the first electronic device 501 and then receive the auditory data from the first electronic device 501. If there is auditory data, the second electronic device may further check whether there is auditory data in the first electronic device 501. If there is no auditory data in the first electronic device 501, the second electronic device 503 may transmit auditory data to the first electronic device 501. If there is no auditory data in both the first electronic device 501 and the second electronic device 503, the second electronic device 503 may perform a hearing measurement function. For example, the second electronic device 503 may generate auditory data by measuring and analyzing a user's auditory characteristics. The second electronic device 503 may transmit the generated auditory data to the first electronic device 501.

At operation 530, the first electronic device 501 may receive sound from the outside thereof through the microphone. The first electronic device 501 may store data about the received sound, at least temporarily. For example, the first electronic device 501 may convert the received sound into digital data and store it.

At operation 540, the first electronic device 501 may correct data about the received sound. For example, using auditory data, the first electronic device 501 may correct the data about the sound to fit a user's auditory characteristics. The first electronic device 501 may correct the data about the sound by using the auditory data stored therein or stored in the second electronic device 503. In order to correct the data about the sound, the first electronic device 501 may use the auditory data previously stored therein or use the auditory data stored in and received from the second electronic device 503. Based on the auditory data, the first electronic device 501 may amplify or modulate at least part of the data about the sound.

At operation 550, the second electronic device 503 may reproduce audio data. For example, the second electronic device 503 may detect an event for reproducing audio data. The reproduction of audio data may include a voice reproduction on a telephone call or playback of audio or video content. For example, the second electronic device 503 may play back specific content containing audio in response to a user's input. The second electronic device 503 may reproduce a voice during a telephone call. For example, the second electronic device 503 may reproduce a user's voice and a called party's voice when making a call or receiving a call.

At operation 560, the second electronic device 503 may correct the reproduced audio data. For example, using the auditory data, the second electronic device 503 may correct the audio data to fit a user's auditory characteristics. For example, based on the auditory data, the second electronic device 503 may amplify or modulate at least part of the audio data being reproduced or to be reproduced.

At operation 570, the second electronic device 503 may transmit the corrected audio data to the first electronic device 501. The second electronic device 503 may transmit, to the first electronic device 501, corrected voice data about a conversation during a call. The second electronic device 503 may transmit, to the first electronic device 501, corrected audio data of content being played back.

At operation 580, the first electronic device 501 may synthesize the corrected sound data and the corrected audio data to obtain synthesized data. The first electronic device 501 may mix the corrected sound data and the corrected audio data according to a predetermined ratio.

At operation 590, the first electronic device 501 may output a new sound corresponding to the synthesized data through the speaker. For example, the first electronic device 501 may convert the synthesized data into an analog signal (e.g., a sound) and output the analog signal.

When connected, the first electronic device 501 and the second electronic device 503 can automatically share the auditory data. Therefore, data correction using auditory data is possible without a need of generating the auditory data by measuring a user's auditory characteristics, whenever a connected device is changed. Each of the connected first and second electronic devices 501, 503, which share auditory data, can correct and provide different data (e.g., data about an outside sound or audio data being reproduced internally), thus increasing a processing speed and improving a user's convenience.

Figure 6:
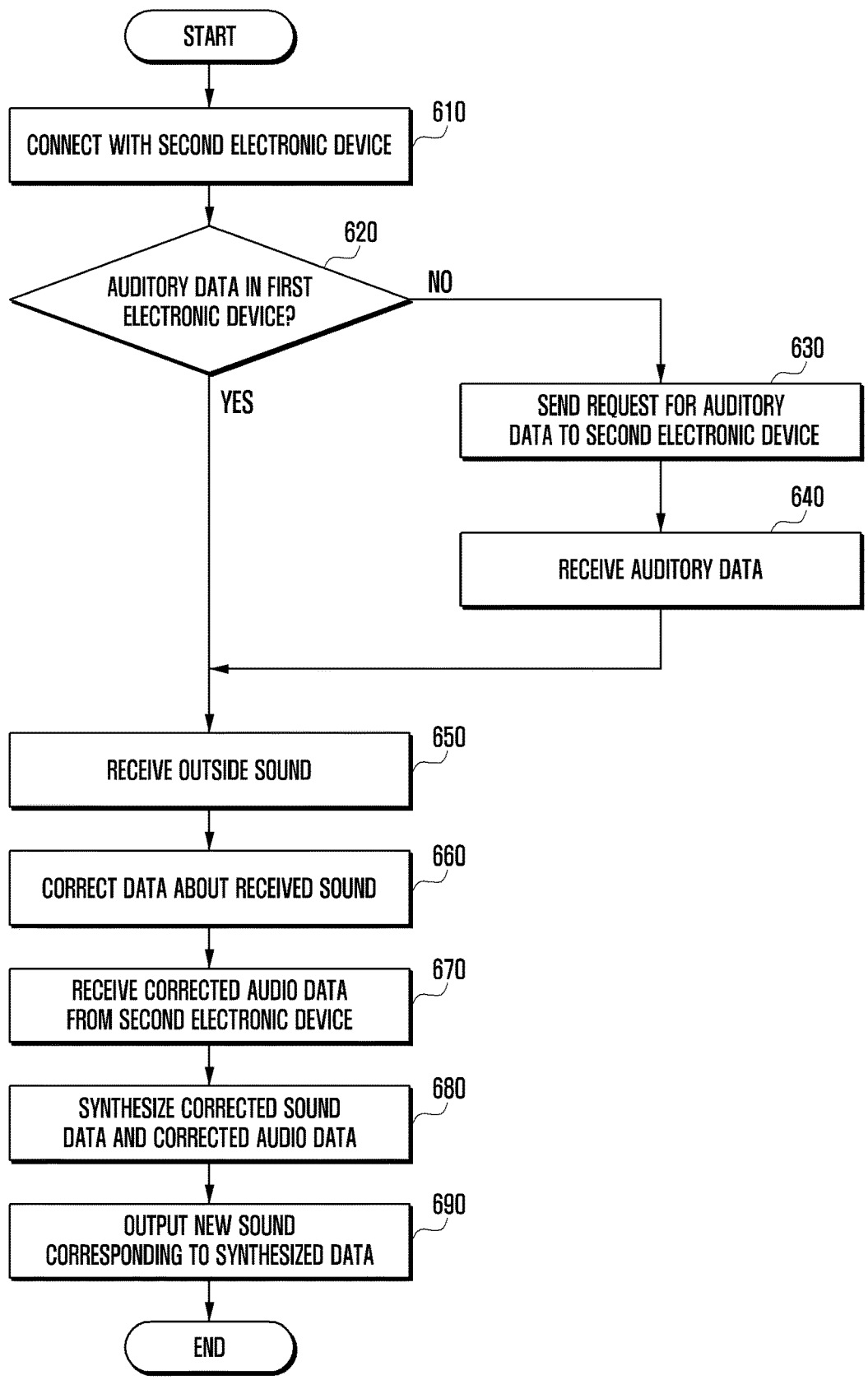
FIG. 6 is a flowchart of a control method of a first electronic device, according to an embodiment of the present disclosure.

FIG. 6 is a flowchart of a method of a first electronic device, according to an embodiment of the present disclosure.

At operation 610, the first electronic device 501 (e.g., a headset) may be connected with the second electronic device 503 (e.g., a portable terminal), in a manner as described above.

At operation 620, the first electronic device 501 may determine whether there is auditory data therein. The auditory data may include information about the amount of noise attenuation, a filter value, a pass frequency, a cutoff frequency, a sound amplification value, directionality, user-specific fitting parameters, etc., corresponding to a user's auditory characteristics.

The first electronic device 501 may perform operation 650 when there is auditory data, and may perform operation 630 when there is no auditory data.

At operation 630, the first electronic device 501 may send a request for auditory data to the second electronic device 503. The first electronic device may send information about the user of the first electronic device 501 to the second electronic device 503 so as to request the auditory data corresponding to the user of the first electronic device 501.

At operation 640, the first electronic device 501 may receive the auditory data from the second electronic device 503. The first electronic device 501 may receive the auditory data corresponding to the user of the first electronic device 501 from the second electronic device 503.

At operation 650, the first electronic device 501 may receive an outside sound. The first electronic device 501 may receive a sound from the outside thereof through the microphone and then store data about the received sound, at least temporarily. For example, the first electronic device 501 may convert the outside sound into electrical data (e.g., digital data).

At operation 660, the first electronic device 501 may correct the data about the outside sound. Using auditory data, the first electronic device 501 may correct the data about the sound to fit the user's auditory characteristics. The first electronic device 501 may amplify or modulate at least part of the data about the sound to correspond to the user's auditory characteristics.

At operation 670, the first electronic device 501 may receive corrected audio data from the second electronic device 503. The first electronic device 501 may receive data corrected by the second electronic device 503 for audio data being reproduced in the second electronic device 503. The corrected audio data may be data obtained by correcting the audio data being reproduced in the second electronic device 503. This correction may be performed using auditory data by the second electronic device 503.

At operation 680, the first electronic device 501 may synthesize the corrected data about the sound (i.e., the corrected sound data) and the corrected audio data, thus obtaining synthesized data. The first electronic device 501 may mix the corrected sound data and the corrected audio data according to a predetermined ratio or parameter value.

At operation 690, the first electronic device 501 may output, through the speaker, a new sound corresponding to the synthesized data obtained at operation 680. The first electronic device 501 may convert the synthesized data into an analog signal (i.e., a sound) and then output the analog signal. The first electronic device 501 may output a mixed sound obtained by correcting each of the outside sound and the audio data reproduced in the second electronic device 503 to fit the user's auditory characteristics, based on the auditory data.

All or some of the above operations may be performed in a different order. For example, if the second electronic device 503 reproduces and corrects the audio data, the first electronic device 501 may receive the corrected audio data in real time from the second electronic device 503. The first electronic device 501 may receive the outside sound in real time and correct the received sound.

Both the first electronic device 501 and the second electronic device 503 have the ability to correct the sound data or the audio data by using the auditory data, and thus each of the first and second electronic devices 501, 503 may separately perform a correction of different data. It is therefore possible to reduce the entire time required for data correction and enhance the efficiency of data correction.

Figure 7:
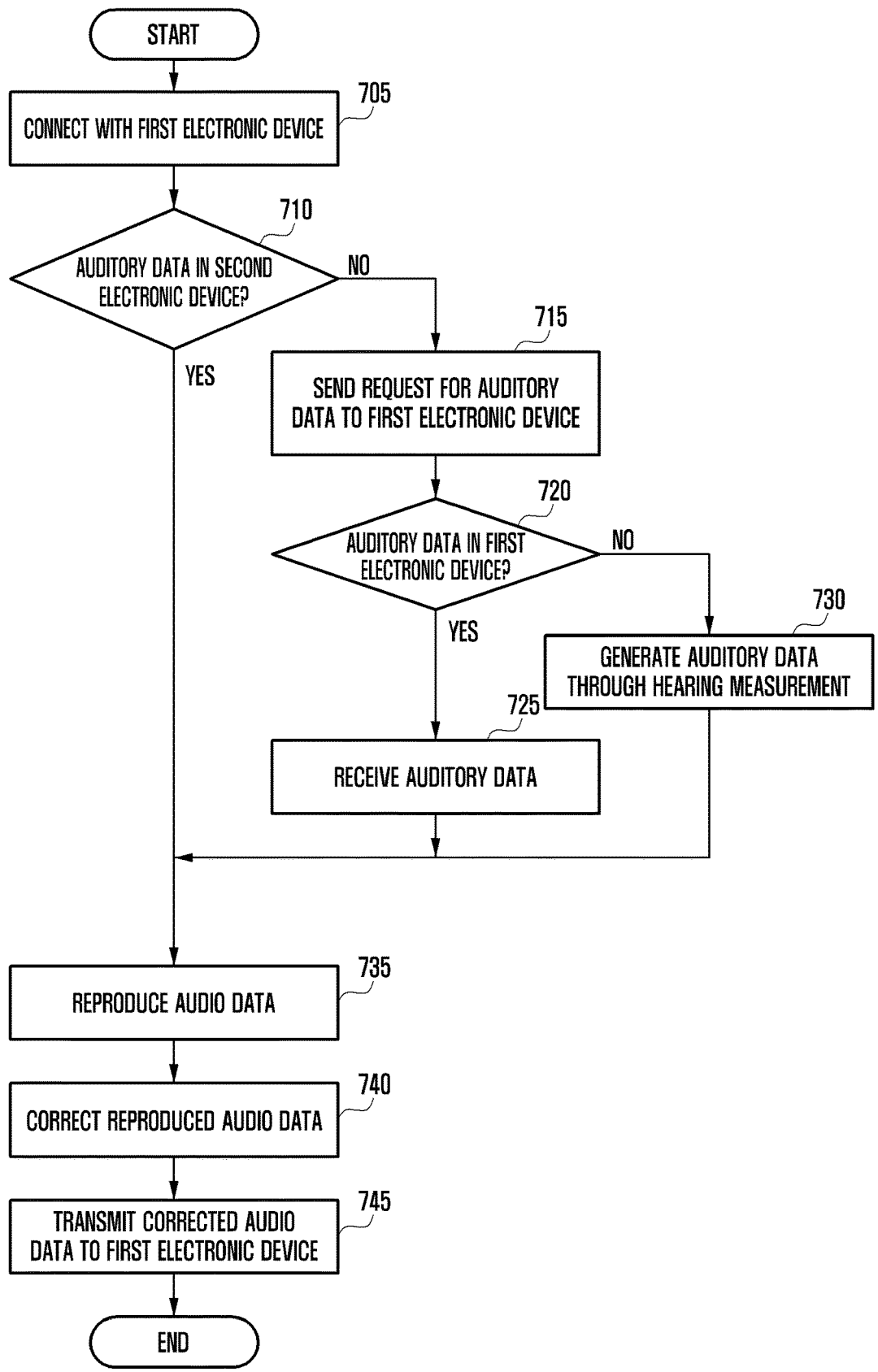
FIG. 7 is a flowchart of a control method of a second electronic device, according to an embodiment of the present disclosure.

FIG. 7 is a flowchart of a method of a second electronic device, according to an embodiment of the present disclosure.

At operation 705, the second electronic device 503 (e.g., a portable terminal) may be connected with the first electronic device 501 (e.g., a headset), in a manner as described above.

At operation 710, the second electronic device 503 may determine whether there is auditory data therein. The auditory data may include information about the amount of noise attenuation, a filter value, a pass frequency, a cutoff frequency, a sound amplification value, directionality, user-specific fitting parameters, etc., corresponding to user's auditory characteristics.

The second electronic device 503 may perform operation 735 when there is auditory data, and may perform operation 715 when there is no auditory data.

At operation 715, the second electronic device 503 may send a request for auditory data to the first electronic device 501. The second electronic device 503 may send information about the user of the second electronic device 503 to the first electronic device 501 so as to request the auditory data corresponding to the user of the second electronic device 503.

At operation 720, the second electronic device 503 may further determine whether there is auditory data in the first electronic device 501. The second electronic device 503 may check a response of the first electronic device 501 to the request for auditory data. The second electronic device 503 may receive, from the first electronic device 501, a response about the presence or absence of auditory data. The second electronic device 503 may receive, from the first electronic device 501, a signal or information indicating that there is no auditory data.

The second electronic device 503 may perform operation 725 when there is auditory data in the first electronic device 501, and may perform operation 730 when there is no auditory data in the first electronic device 501.

At operation 725, the second electronic device 503 may receive the auditory data from the first electronic device 501. The second electronic device 503 may receive the auditory data corresponding to the user of the second electronic device 503 from the first electronic device 501.

At operation 730, the second electronic device 503 may generate auditory data through a hearing measurement. The second electronic device 503 may perform a hearing measurement function. The second electronic device 503 may store the auditory data generated as a result of the hearing measurement. The second electronic device 503 may transmit the generated auditory data to the first electronic device 501.

At operation 735, the second electronic device 503 may reproduce audio data. The second electronic device 503 may detect an event for reproducing audio data. The reproduction of audio data may include the reproduction of voice data during a telephone call or the playback of audio data of content containing audio. The second electronic device 503 may play back specific content containing audio in response to a user's input. The second electronic device 503 may make a call or receive a call and reproduce a user's voice and a called party's voice. The second electronic device 503 may internally reproduce audio data (e.g., a voice on a call, content having audio).

At operation 740, the second electronic device 503 may correct the reproduced audio data. The second electronic device 503 may correct the audio data before converting the reproduced audio data into a sound. The second electronic device 503 may correct the audio data to fit a user's auditory characteristics by using auditory data.

At operation 745, the second electronic device 503 may transmit the corrected audio data to the first electronic device 501. The second electronic device 503 may request or control the first electronic device 501 to output a sound corresponding to the corrected audio data.

If the second electronic device 503 fails to correct the audio data (e.g., has no function of audio data correction), the second electronic device 503 may transmit audio data prior to correction to the first electronic device 501.

Figure 8:
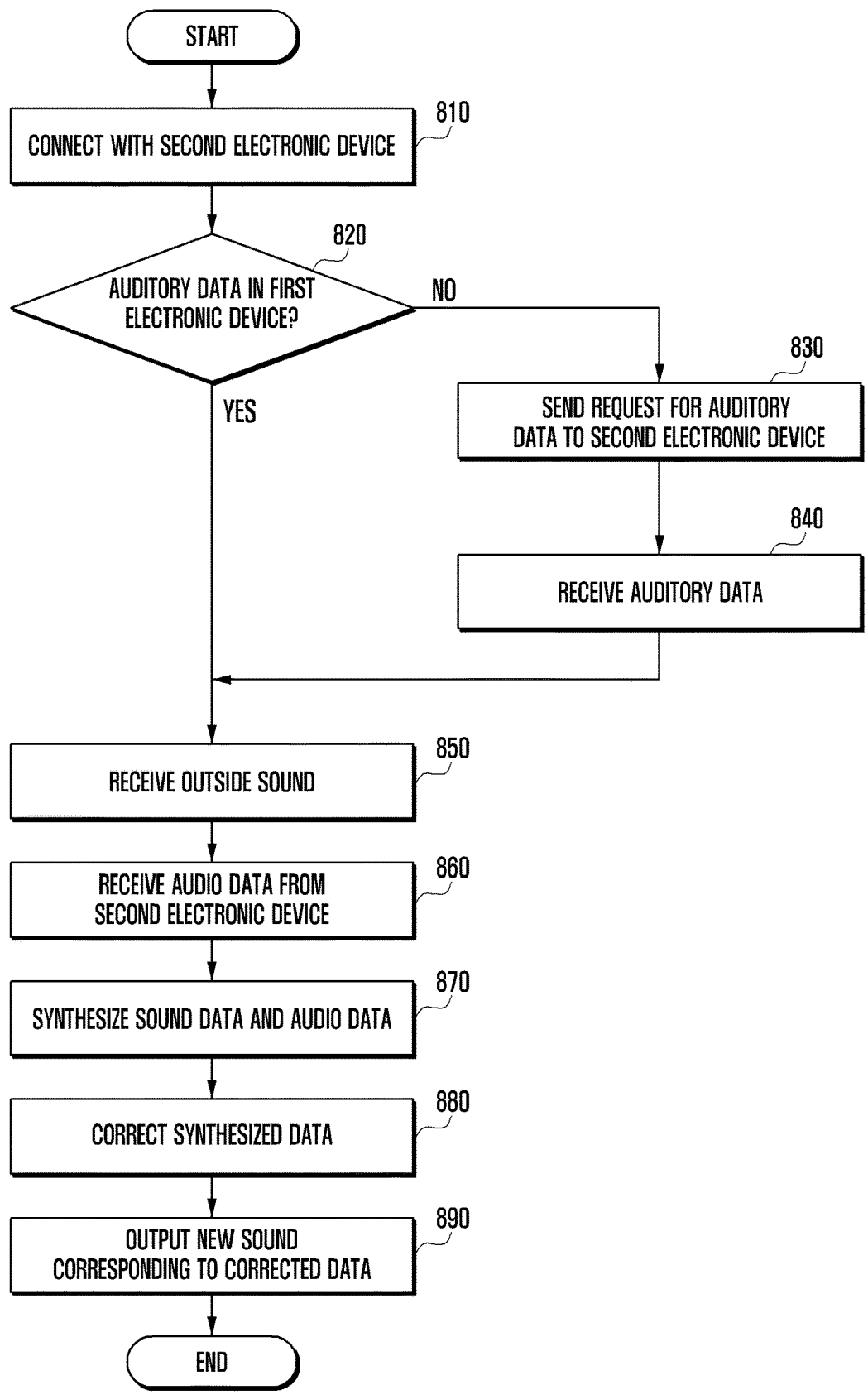
FIG. 8 is a flowchart of a control method of a first electronic device, according to an embodiment of the present disclosure.

FIG. 8 is a flowchart of a method of a first electronic device, according to an embodiment of the present disclosure.

At operation 810, the first electronic device 501 (e.g., a headset) may be connected with the second electronic device 503 (e.g., a portable terminal) through wired or wireless communication.

At operation 820, the first electronic device 501 may determine whether there is auditory data therein. The auditory data may include information about the amount of noise attenuation, a filter value, a pass frequency, a cutoff frequency, a sound amplification value, directionality, user-specific fitting parameters, etc., corresponding to a user's auditory characteristics.

When there is auditory data, the first electronic device 501 may further determine whether the second electronic device 503 has auditory data. If the second electronic device 503 has no auditory data, the first electronic device 501 may transmit the auditory data to the second electronic device 503.

The first electronic device 501 may perform operation 850 when there is auditory data, and may perform operation 830 when there is no auditory data.

At operation 830, the first electronic device 501 may send a request for auditory data to the second electronic device 503. The first electronic device 501 may send information about the user of the first electronic device 501 to the second electronic device 503 so as to request the auditory data corresponding to the user of the first electronic device 501.

At operation 840, the first electronic device 501 may receive the auditory data corresponding to the user of the first electronic device 501 from the second electronic device 503.

At operation 850, the first electronic device 501 may receive an outside sound. The first electronic device 501 may receive a sound from the outside thereof through the microphone and then store data about the received sound, at least temporarily.

At operation 860, the first electronic device 501 may receive audio data from the second electronic device 503. The audio data may be data about a sound being reproduced internally in the second electronic device 503. The audio data may include voice data about a telephone call between the user and the called party when the second electronic device 503 is in a call, or audio data of content when the second electronic device 503 plays back the content containing audio. The second electronic device 503 may not provide a correction function of audio data. In this case, the first electronic device 501 may receive audio data from the second electronic device 503 to correct the audio data being reproduced in the second electronic device 501.

At operation 870, the first electronic device 501 may synthesize the data about the sound and the received audio data, thus obtaining synthesized data. For example, the first electronic device 501 may mix the sound data and the audio data according to a predetermined ratio or parameter value.

At operation 880, the first electronic device 501 may correct the synthesized data. Using auditory data, the first electronic device 501 may correct the synthesized data to fit user's auditory characteristics.

At operation 890, the first electronic device 501 may output a new sound corresponding to the synthesized and corrected data. The first electronic device 501 may convert the corrected data into an analog signal (i.e., a sound) and then output the analog signal through the speaker.

Figure 9:
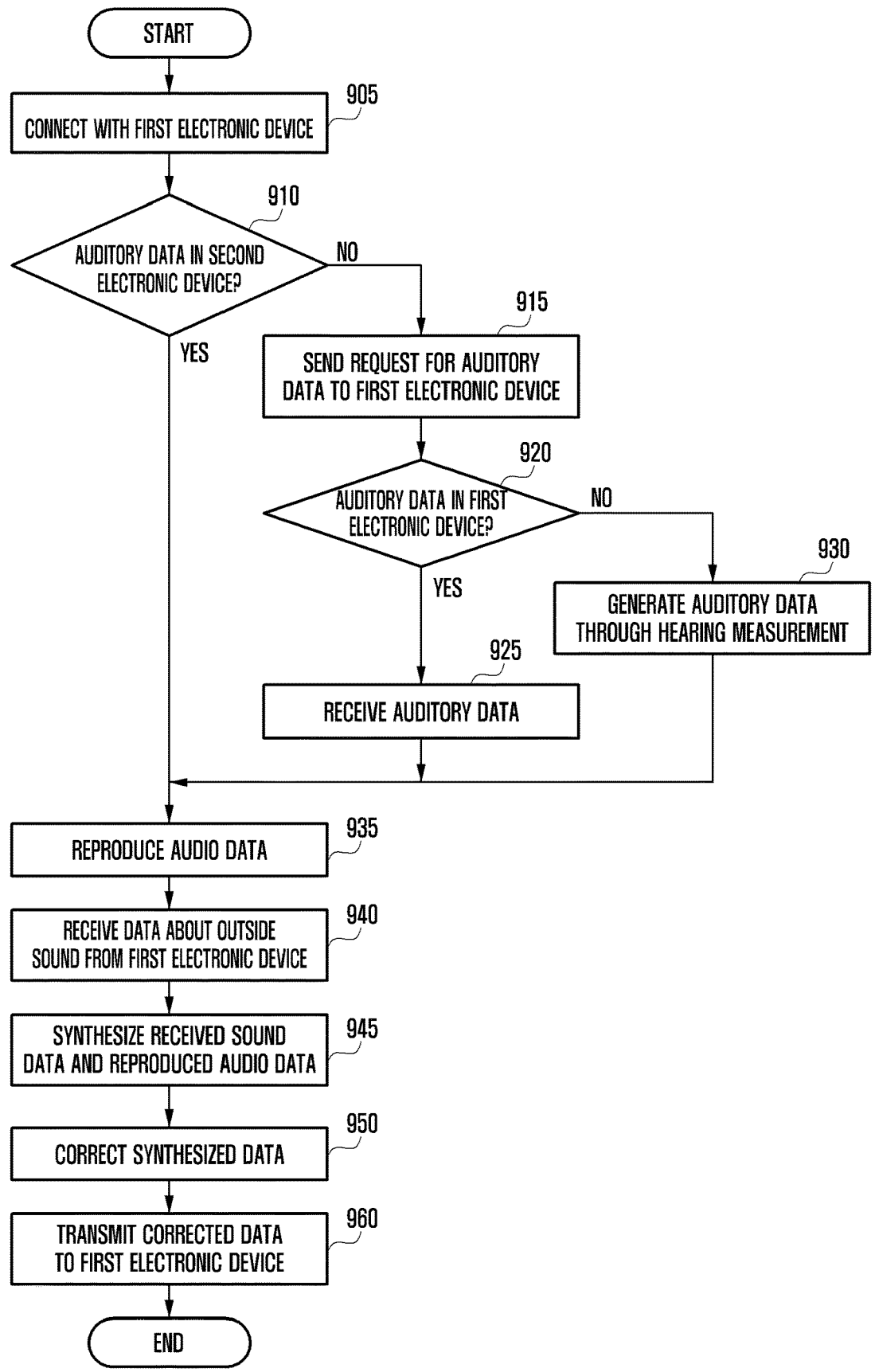
FIG. 9 is a flowchart of a control method of a second electronic device, according to an embodiment of the present disclosure.

FIG. 9 is a flowchart of a method of a second electronic device, according to an embodiment of the present disclosure.

At operation 905, the second electronic device 503 (e.g., a portable terminal) may be connected with the first electronic device 501 (e.g., a headset) through wired or wireless communication.

At operation 910, the second electronic device 503 may determine whether there is auditory data therein. The auditory data may include information about the amount of noise attenuation, a filter value, a pass frequency, a cutoff frequency, a sound amplification value, directionality, user-specific fitting parameters, etc., corresponding to a user's auditory characteristics.

When there is auditory data, the second electronic device 503 may further determine whether the first electronic device 501 has auditory data. If the first electronic device 501 has no auditory data, the second electronic device 503 may transmit the auditory data to the first electronic device 501.

The second electronic device 503 may perform operation 935 when there is auditory data, and may perform operation 915 when there is no auditory data.

At operation 915, the second electronic device 503 may send a request for auditory data to the first electronic device 501. The second electronic device 503 may send information about the user of the second electronic device 503 to the first electronic device 501 to request the auditory data corresponding to the user of the second electronic device 503.

At operation 920, the second electronic device 503 may further determine whether there is auditory data in the first electronic device 501. The second electronic device 503 may send a request to the first electronic device 501 to confirm the presence or absence of auditory data, and may receive a response to the presence or absence of auditory data from the first electronic device 501.

The second electronic device 503 may perform operation 925 when there is auditory data in the first electronic device 501, and may perform operation 930 when there is no auditory data in the first electronic device 501.

At operation 925, the second electronic device 503 may receive the auditory data from the first electronic device 501. The second electronic device 503 may receive the auditory data corresponding to the user of the second electronic device 503 from the first electronic device 501.

At operation 930, the second electronic device 503 may generate auditory data through hearing measurement. The second electronic device 503 may perform a hearing measurement function. The second electronic device 503 may store the auditory data generated as a result of the hearing measurement.

The second electronic device 503 may transmit the generated auditory data to the first electronic device 501.

At operation 935, the second electronic device 503 may reproduce audio data. The second electronic device 503 may detect an event for reproducing audio data. The reproduction of audio data may include the reproduction of voice data during a telephone call or the playback of audio data of content containing audio.

At operation 940, the second electronic device 503 may receive data about an outside sound from the first electronic device 501. The second electronic device 503 may receive, from the first electronic device 501, data about a sound received by the first electronic device 501 through the microphone of the first electronic device 501. The first electronic device 501 may not provide a correction function of sound data. In this case, the second electronic device 503 may receive such sound data (i.e., data about a sound from the outside of the first electronic device 501) from the first electronic device 501 so as to correct the sound data of the first electronic device 501.

At operation 945, the second electronic device 503 may synthesize the reproduced audio data and the received data about the sound, thus obtaining synthesized data. The second electronic device 503 may mix the audio data and the sound data according to a predetermined ratio or parameter value.

At operation 950, the second electronic device 503 may correct the synthesized data. Using auditory data, the second electronic device 503 may correct the synthesized data to fit a user's auditory characteristics.

At operation 960, the second electronic device 503 may transmit the synthesized and corrected data to the first electronic device 501. The second electronic device 503 may request or control the first electronic device 501 to output a new sound corresponding to the synthesized and corrected data.

When a plurality of electronic devices are connected with each other, these devices can automatically share auditory data. In addition, sound data or audio data can be transmitted to and corrected at a specific electronic device having a data correction function. Therefore, even though there is an electronic device having no data or function, it is possible to easily provide a hearing aid function (i.e., a correction function of sound or audio data).

A method for controlling operations of an electronic device including a microphone and a speaker includes determining whether there is auditory data in the electronic device, when the electronic device is connected with an external electronic device; sending a request for the auditory data to the external electronic device when there is no auditory data; receiving the auditory data from the external electronic device; correcting data about a sound of an outside of the electronic device received through the microphone by using the auditory data; receiving corrected audio data from the external electronic device; synthesizing the corrected data about the sound and the corrected audio data to obtain first synthesized data; and outputting a first new sound corresponding to the first synthesized data through the speaker.

The corrected audio data may include data obtained by correcting audio data reproduced in the external electronic device by using the auditory data.

The method may further include receiving audio data from the external electronic device when there is the auditory data in the electronic device; synthesizing the data about the sound and the received audio data to obtain second synthesized data; correcting the second synthesized data by using the auditory data; and outputting a second new sound corresponding to the corrected second synthesized data through the speaker.

The method may further include checking whether there is the auditory data in the external electronic device, when there is the auditory data in the electronic device; and transmitting the auditory data to the external electronic device when there is no auditory data in the external electronic device.

The method may further include transmitting the data about the sound to the external electronic device; receiving corrected data of second synthesized data obtained by synthesizing the data about the sound and audio data from the external electronic device; and outputting a second new sound corresponding to the received corrected data through the speaker.

A method for controlling operations of an electronic device includes determining whether there is auditory data in the electronic device, when the electronic device is connected with an external electronic device; sending a request for the auditory data to the external electronic device when there is no auditory data; receiving the auditory data from the external electronic device; correcting audio data reproduced in the electronic device by using the auditory data; and transmitting the corrected audio data to the external electronic device.

The method may further include checking whether there is the auditory data in the external electronic device, when there is the auditory data in the electronic device; and transmitting the auditory data to the external electronic device when there is no auditory data in the external electronic device.

The method may further include generating the auditory data by performing a hearing measurement function when there is no auditory data in both the electronic device and the external electronic device.

The method may further include transmitting the generated auditory data to the external electronic device.

The method may further include receiving, from the external electronic device, data about a sound received by the external electronic device; synthesizing the received data about the sound and the reproduced audio data to obtain synthesized data; correcting the synthesized data; and transmitting the corrected synthesized data to the external electronic device.

At least a portion of a method (e.g., operations) or a device (e.g., modules or functions thereof) may be implemented with an instruction stored on a non-transitory computer-readable storage media in a form of a programming module. When the instruction is executed by at least one processor (e.g., the processor 120 or the AP 210), the at least one processor may perform a function corresponding to the instruction. The non-transitory computer-readable storage media may be, for example, the memory 130. At least a portion of the programming module may be implemented (e.g., executed) by the at least one processor. At least a portion of the programming module may include a module, a program, a routine, sets of instructions, or a process that performs at least one function.

The non-transitory computer-readable storage media may include magnetic media such as a hard disk, floppy disk, and magnetic tape, optical media such as a compact disc read only memory (CD-ROM) and a digital versatile disc (DVD), magneto-optical media such as a floptical disk, and a hardware device, specially formed to store and perform a program instruction (e.g., a programming module), such as a read only memory (ROM), a random access memory (RAM), a flash memory. Further, a program instruction may include a high-level language code that may be executed by a computer using an interpreter as well as a machine language code generated by a compiler. In order to perform any of the aforementioned operations, the above-described hardware device may be formed to operate as at least one software module, and vice versa.

A module or a programming module as described herein may include at least one of the foregoing constituent elements, may omit some constituent elements, or may further include additional other constituent elements. Operations performed by a module, a programming module, or another constituent element may be executed with a sequential, parallel, repeated, or heuristic method. Further, some operations may be executed in different orders, may be omitted, or may add other operations.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
   a communication circuit;
   a speaker;
   a microphone configured to receive a sound;
   a memory; and
   a processor electrically connected with the communication circuit, the speaker, the microphone, and the memory, and configured to:
      determine whether there is auditory data stored in the memory of the electronic device when an external electronic device is connected thereto through the communication circuit,
      send a request for auditory data to the external electronic device when there is no auditory data stored in the memory,
      receive the auditory data from the external electronic device,
      correct data, at the electronic device, about the sound received through the microphone using the auditory data,
      receive corrected audio data from the external electronic device,
      synthesize the corrected data about the sound and the corrected audio data received from the external device to obtain first synthesized data, and
      output a first new sound corresponding to the first synthesized data through the speaker.

2. The electronic device of claim 1, wherein the corrected audio data is data obtained by correcting audio data reproduced in the external electronic device using the auditory data.

3. The electronic device of claim 1, wherein the processor is further configured to:
   receive audio data from the external electronic device when the auditory data is in the electronic device,
   synthesize the data about the sound and the received audio data to obtain second synthesized data,
   correct the second synthesized data using the auditory data, and
   output a second new sound corresponding to the corrected second synthesized data through the speaker.

4. The electronic device of claim 1, wherein the processor is further configured to:
   check whether the auditory data is in the external electronic device when the auditory data is in the electronic device, and
   transmit the auditory data to the external electronic device when there is no auditory data in the external electronic device.

5. The electronic device of claim 1, wherein the processor is further configured to:
   transmit the data about the sound to the external electronic device,
   receive corrected data of second synthesized data obtained by synthesizing the data about the sound and audio data from the external electronic device, and
   output a second new sound corresponding to the received corrected data through the speaker.

6. An electronic device comprising:
   a communication circuit;
   a speaker;
   a microphone;
   a memory; and
   a processor electrically connected with the communication circuit, the speaker, the microphone, and the memory, and configured to:
      determine whether there is auditory data specific to a user stored in the memory of the electronic device when an external electronic device is connected thereto through the communication circuit, the external electronic device being worn by the user,
      send a request for the auditory data to the external electronic device when there is no auditory data stored in the memory,
      identify whether the external electronic device stores the auditory data,
      receive the auditory data from the external electronic device without performing a hearing measurement function in response to identifying that the external electronic device stores the auditory data, or generate the auditory data by performing the hearing measurement function in response to identifying that the external electronic device does not store the auditory data,
      correct audio data reproduced in the electronic device using the auditory data, and
      transmit the corrected audio data to the external electronic device to be output through a speaker of the external electronic device.

7. The electronic device of claim 6, wherein the processor is further configured to:
   check whether the auditory data is in the external electronic device when the auditory data is in the electronic device, and
   transmit the auditory data to the external electronic device when there is no auditory data in the external electronic device.

8. The electronic device of claim 6, wherein the processor is further configured to:
   generate the auditory data by performing a hearing measurement function when there is no auditory data in both the electronic device and the external electronic device.

9. The electronic device of claim 8, wherein the processor is further configured to:
   transmit the generated auditory data to the external electronic device.

10. The electronic device of claim 6, wherein the processor is further configured to:
    receive, from the external electronic device, data about a sound received by the external electronic device,
    synthesize the received data about the sound and the reproduced audio data to obtain synthesized data,
    correct the synthesized data, and
    transmit the corrected synthesized data to the external electronic device.

11. A method for controlling an electronic device including a microphone and a speaker, the method comprising:
    determining whether there is auditory data in the electronic device when the electronic device is connected with an external electronic device;
    sending a request for the auditory data to the external electronic device when there is no auditory data in the electronic device;

receiving the auditory data from the external electronic device;

correcting data about a sound received through the microphone of the electronic device using the auditory data;

receiving corrected audio data from the external electronic device;

synthesizing the corrected data about the sound and the corrected audio data to obtain first synthesized data; and outputting a first new sound corresponding to the first synthesized data through the speaker.

12. The method of claim 11, wherein the corrected audio data is data obtained by correcting audio data reproduced in the external electronic device using the auditory data.

13. The method of claim 11, further comprising:

receiving audio data from the external electronic device when the auditory data is in the electronic device;

synthesizing the data about the sound and the received audio data to obtain second synthesized data;

correcting the second synthesized data using the auditory data; and outputting a second new sound corresponding to the corrected second synthesized data through the speaker.

14. The method of claim 11, further comprising:

checking whether the auditory data is in the external electronic device when the auditory data is in the electronic device; and transmitting the auditory data to the external electronic device when there is no auditory data in the external electronic device.

15. The method of claim 11, further comprising:

transmitting the data about the sound to the external electronic device;

receiving corrected data of second synthesized data obtained by synthesizing the data about the sound and audio data from the external electronic device; and outputting a second new sound corresponding to the received corrected data through the speaker.

16. A method for controlling an electronic device, the method comprising:

determining whether there is auditory data specific to a user in the electronic device when the electronic device is connected with an external electronic device, the external electronic device being worn by the user;

sending a request for the auditory data to the external electronic device when there is no auditory data in the electronic device;

identifying whether the external electronic device stores the auditory data;

receiving the auditory data from the external electronic device without performing a hearing measurement function in response to identifying that the external electronic device stores the auditory data, or generating the auditory data by performing the hearing measurement function in response to identifying that the external electronic device does not store the auditory data;

correcting audio data reproduced in the electronic device using the auditory data; and transmitting the corrected audio data to the external electronic device to be output by a speaker of the external electronic device.

17. The method of claim 16, further comprising:

checking whether the auditory data is in the external electronic device when the auditory data is in the electronic device; and transmitting the auditory data to the external electronic device when there is no auditory data in the external electronic device.

18. The method of claim 16, further comprising:

generating the auditory data by performing a hearing measurement function when there is no auditory data in both the electronic device and the external electronic device.

19. The method of claim 18, further comprising:

transmitting the generated auditory data to the external electronic device.

20. The method of claim 16, further comprising:

receiving, from the external electronic device, data about a sound received by the external electronic device;

synthesizing the received data about the sound and the reproduced audio data to obtain synthesized data;

correcting the synthesized data; and transmitting the corrected synthesized data to the external electronic device.

* * * * *